(12) United States Patent
Ji

(10) Patent No.: US 9,445,162 B2
(45) Date of Patent: Sep. 13, 2016

(54) INTERACTIVE PERSONAL/INTERNET PROTOCOL TELEVISION RESERVATION SYSTEM, RESERVATION PLAN MANAGEMENT METHOD AND DEVICE

(71) Applicant: ZTE Corporation, Shenzhen, Guangdong (CN)

(72) Inventor: Jian Ji, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/434,488

(22) PCT Filed: Jul. 17, 2013

(86) PCT No.: PCT/CN2013/079557
§ 371 (c)(1),
(2) Date: Apr. 9, 2015

(87) PCT Pub. No.: WO2013/170823
PCT Pub. Date: Nov. 21, 2013

(65) Prior Publication Data
US 2015/0264448 A1   Sep. 17, 2015

(30) Foreign Application Priority Data

Oct. 15, 2012   (CN) .......................... 2012 1 0391128

(51) Int. Cl.
*G06F 3/00* (2006.01)
*G06F 13/00* (2006.01)
(Continued)

(52) U.S. Cl.
CPC ...... *H04N 21/6543* (2013.01); *H04N 21/2181* (2013.01); *H04N 21/231* (2013.01);
(Continued)

(58) Field of Classification Search
CPC .................. H04N 21/6543; H04N 21/2181; H04N 21/2393; H04N 21/231; H04N 21/4334; H04N 21/4583; H04N 21/64322; H04N 21/254; H04N 21/25833; H04N 21/4147; H04N 21/6581; H04N 21/47214; H04N 21/262

USPC ....................... 725/58, 61, 93, 100, 110, 115
See application file for complete search history.

(56) References Cited

U.S. PATENT DOCUMENTS 7,603,688 B2 * 10/2009 DeYonker .......... H04N 5/44543
725/134
7,797,716 B2 *  9/2010 Ishida .................. G11B 27/034
725/134

(Continued)

FOREIGN PATENT DOCUMENTS

CN       101815205 A       8/2010
CN       102474584 A       5/2012

(Continued)

OTHER PUBLICATIONS

International Search Report in international application No. PCT/CN2013/079557, mailed on Oct. 24, 2013.

(Continued)

*Primary Examiner* — Nnenna Ekpo
(74) *Attorney, Agent, or Firm* — Oppedahl Patent Law Firm LLC

(57) ABSTRACT

An Interactive Personal/Internet Protocol Television (IPTV) reservation system, and a reservation plan management method and device are provided. A reservation server receives a reservation plan addition request initiated by a DVR set top box, wherein the reservation plan addition request carries a reservation plan to be added; the reservation server obtains from the shared storage server an added reservation plan which corresponds to the DVR set top box and has been added by a user; and the reservation server performs a conflict processing on the reservation plan to be added, when determining that the reservation plan to be added exceeds a recording ability of the DVR set top box according to the obtained added reservation plan. Accordingly, a problem in the related art that the load of a reservation server is too heavy and a failure processing ability of a system is relatively weak is solved, the load of the reservation server is reduced, and the failure processing ability is improved.

11 Claims, 4 Drawing Sheets

(51) Int. Cl.

| | | |
|---|---|---|
| *H04N 5/445* | (2011.01) | |
| *H04N 21/6543* | (2011.01) | |
| *H04N 21/254* | (2011.01) | |
| *H04N 21/258* | (2011.01) | |
| *H04N 21/4147* | (2011.01) | |
| *H04N 21/658* | (2011.01) | |
| *H04N 21/262* | (2011.01) | |
| *H04N 21/433* | (2011.01) | |
| *H04N 21/472* | (2011.01) | |
| *H04N 21/458* | (2011.01) | |
| *H04N 21/218* | (2011.01) | |
| *H04N 21/231* | (2011.01) | |
| *H04N 21/239* | (2011.01) | |
| *H04N 21/643* | (2011.01) | |

(52) U.S. Cl.
CPC ........ *H04N21/2393* (2013.01); *H04N 21/254* (2013.01); *H04N 21/25833* (2013.01); *H04N 21/262* (2013.01); *H04N 21/4147* (2013.01); *H04N 21/4334* (2013.01); *H04N 21/4583* (2013.01); *H04N 21/47214* (2013.01); *H04N 21/64322* (2013.01); *H04N 21/6581* (2013.01)

(56) References Cited

U.S. PATENT DOCUMENTS

| | | | | |
|---|---|---|---|---|
| 7,861,258 B2 * | 12/2010 | Barton | ................ | G11B 27/105 725/25 |
| 7,917,008 B1 * | 3/2011 | Lee | .......................... | H04N 5/76 386/291 |
| 8,086,478 B2 * | 12/2011 | Chen | ................ | G06Q 10/06314 705/7.18 |
| 8,181,205 B2 * | 5/2012 | Russ | .................... | G11B 27/105 386/297 |
| 8,272,015 B2 * | 9/2012 | Schwesinger | ...... | H04N 5/44543 386/292 |
| 8,316,399 B1 * | 11/2012 | Nush | ................ | H04N 21/4583 725/55 |
| 8,332,855 B2 * | 12/2012 | Dayal | .............. | H04W 72/1215 718/100 |
| 8,347,334 B2 * | 1/2013 | White | .................... | H04N 5/782 725/39 |
| 8,468,454 B2 * | 6/2013 | Poslinski | .............. | G11B 27/34 715/719 |
| 8,528,015 B2 * | 9/2013 | Bumgardner | .......... | H04N 5/765 725/115 |
| 8,549,563 B2 * | 10/2013 | Ellis | .................... | H04N 5/44543 386/292 |
| 8,582,946 B2 * | 11/2013 | Craner | ............... | H04N 5/44543 386/200 |
| 8,627,378 B2 * | 1/2014 | Cordray | ............. | H04N 21/6187 386/291 |
| 8,677,429 B2 * | 3/2014 | Lehman | ........................ | 386/292 |
| 8,737,801 B2 * | 5/2014 | Putterman | ................ | H04N 5/76 386/212 |
| 8,739,230 B2 * | 5/2014 | McEnroe | ........... | H04N 7/17318 709/208 |
| 8,826,351 B2 * | 9/2014 | Li | ............................ | H04N 5/76 386/295 |
| 9,032,444 B2 * | 5/2015 | Stallings | ............ | H04N 21/4331 725/37 |
| 9,264,652 B2 * | 2/2016 | Smith | ..................... | H04N 5/782 |
| 2001/0047419 A1 | 11/2001 | Gonno | | |
| 2003/0204848 A1 * | 10/2003 | Cheng | .................... | H04N 5/782 725/58 |
| 2005/0131950 A1 | 6/2005 | Lee | | |
| 2005/0273819 A1 * | 12/2005 | Knudson | ............ | H04N 5/44543 725/58 |
| 2006/0064721 A1 | 3/2006 | Del Val | | |
| 2007/0118857 A1 | 5/2007 | Chen | | |
| 2008/0022331 A1 | 1/2008 | Barrett | | |
| 2008/0127273 A1 | 5/2008 | Chen | | |
| 2008/0178225 A1 | 7/2008 | Jost | | |
| 2008/0196065 A1 | 8/2008 | Cheng | | |
| 2008/0209491 A1 | 8/2008 | Hasek | | |
| 2009/0010610 A1 * | 1/2009 | Scholl | .................. | G11B 27/105 386/314 |
| 2012/0124635 A1 | 5/2012 | Barbieri | | |
| 2012/0224834 A1 | 9/2012 | Chen | | |
| 2012/0291104 A1 | 11/2012 | Hasek | | |
| 2015/0201228 A1 | 7/2015 | Hasek | | |

FOREIGN PATENT DOCUMENTS

| | | |
|---|---|---|
| CN | 102917249 A | 2/2013 |
| EP | 1146731 A2 | 10/2001 |
| EP | 1895778 A1 | 3/2008 |
| GB | 2477514 A | 8/2011 |

OTHER PUBLICATIONS

English Translation of the Written Opinion of the International Search Authority in international application No. PCT/CN2013/079557, mailed on Oct. 24, 2013.

Supplementary European Search Report in European application No. 13791441.2, mailed on Sep. 4, 2015.

* cited by examiner

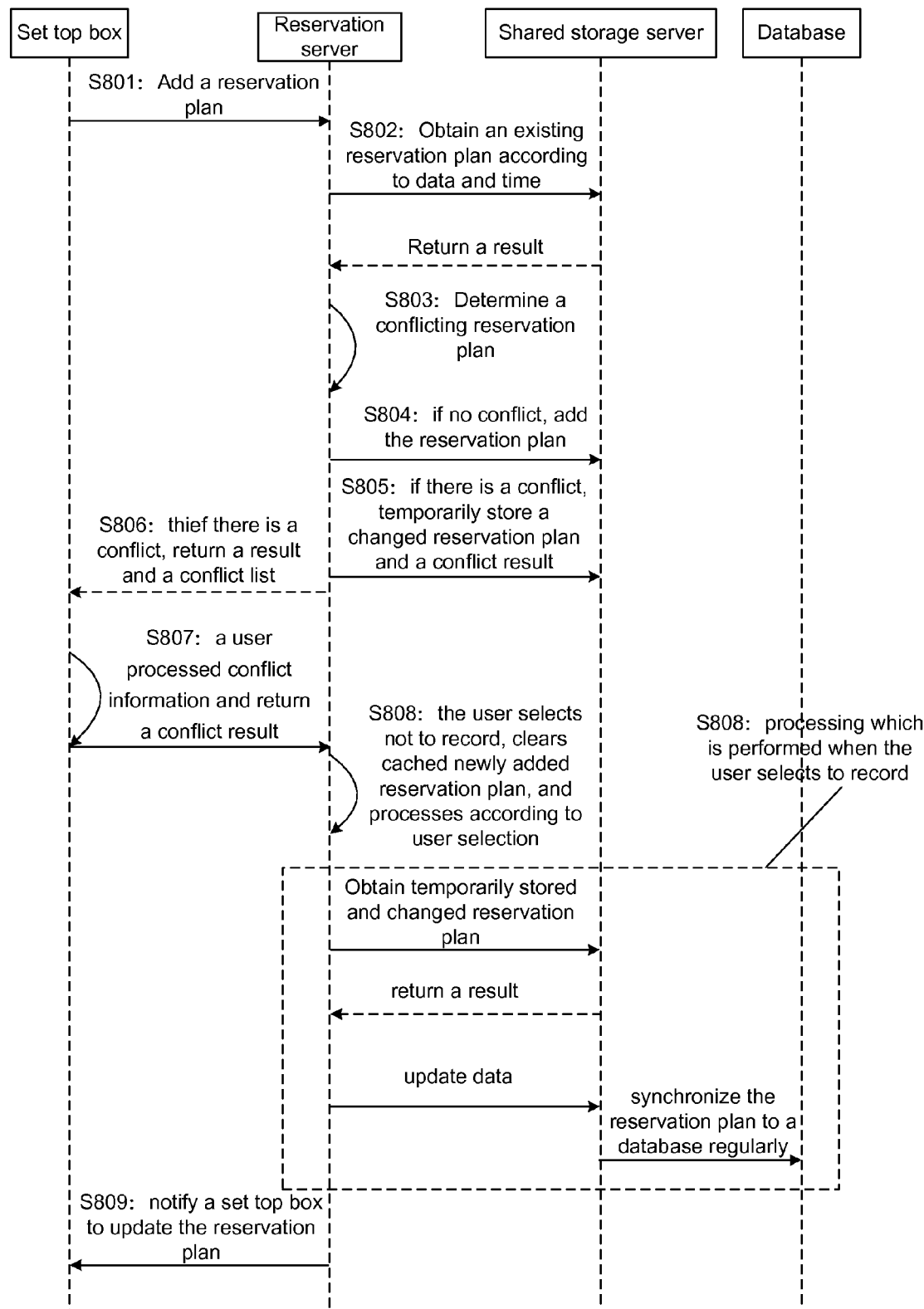

INTERACTIVE PERSONAL/INTERNET PROTOCOL TELEVISION RESERVATION SYSTEM, RESERVATION PLAN MANAGEMENT METHOD AND DEVICE

TECHNICAL FIELD

The disclosure relates to a telecommunication field, and particularly relates to an Interactive Personal/Internet Protocol Television (IPTV) reservation system, and a reservation plan management method and device.

BACKGROUND

IPTV is a cable television network technology using broadband, which is a new technology combining internet, multimedia, communication and other technologies, and provides families with multiple kinds of interactive services including digital television. A reservation plan is referred to a task which records a program assigned by a user within a record time set by an IPTV user. However, since there is a limit to a Central Processing Unit (CPU) of a set top box, a memory processing ability and broadband, thus users cannot add reservation plans unlimitedly in the same time interval. For example, when a reservation plan of a user is added to a certain extent, there may exist a conflict between a newly-added reservation plan and a previous reservation plan, thus probably resulting in that the set top box cannot complete all reservation plans due to lack of record ability.

Currently, the management of reservation plans is performed in a reservation server, resulting in a heavy load of the reservation server; and at the same time, since the reservation server also needs to allocate resources to store the reservation plans, the ability of the reservation server to process the reservation plans is reduced.

Furthermore, since each reservation server only stores the reservation plans corresponding to the reservation server itself, when a certain reservation server fails, other reservation servers cannot manage the reservation plans corresponding to this failed reservation server, and thus the user corresponding to this failed reservation server cannot add the reservation plans.

At present, there is no effective solution to solve the problem that the heavy load of a reservation server results in a low performance and a weak ability of an IPTV reservation system to process the failed reservation server.

SUMMARY

The embodiments of the disclosure provide an IPTV reservation system and a reservation plan management method and device, so as to at least solve a technical problem that in the related art, the load of a reservation server is too heavy and the ability of system to process a failure is relatively low.

According to an aspect of the embodiments of the disclosure, an IPTV reservation system is provided, which includes a Digital Video Recorder (DVR) set top box, at least two reservation servers, a shared storage server, and an IPTV service system database; wherein the DVR set top box is configured to initiate a reservation plan addition request, and the reservation plan addition request carries a reservation plan to be added;

the reservation server each is connected with the DVR set top box, and is configured to obtain an added reservation plan which corresponds to the DVR set top box and has been added by a user, from the shared storage server, and to perform a conflict processing on the reservation plan to be added when determining that the reservation plan to be added exceeds a recording ability of the DVR set top box according to the obtained added reservation plan; and the shared storage server is connected to the reservation servers, and is configured to store the added reservation plan which corresponds to the DVR set top box and has been added by the user.

Preferably, the system may further include:

an IPTV service system database, connected with the shared storage server, and configured to store reservation plan data information and/or time stamp data synchronized to local by the shared storage server.

According to another aspect of the embodiment of the disclosure, a reservation plan management method is provided, which includes that a reservation server receives a reservation plan addition request initiated by a Digital Video Recorder (DVR) set top box, wherein the reservation plan addition request carries a reservation plan to be added; the reservation server obtains from a shared storage server an added reservation plan which corresponds to the DVR set top box and has been added by a user; and the reservation server performs a conflict processing on the reservation plan to be added, when the reservation server determines that the reservation plan to be added exceeds a recording ability of the DVR set top box according to the obtained added reservation plan.

Preferably, the method may further include that after the reservation server receives the reservation plan addition request initiated by the DVR set top box and determines that a time difference between current time and completion time of the reservation plan to be added is smaller than a predetermined threshold, the reservation server notifies the DVR set top box of that the reservation plan to be added is not allowed to be added.

Preferably, the step of the reservation server determining that the reservation plan to be added exceeds the recording ability of the DVR set top box according to the obtained added reservation plan may include that:

the reservation server determines an added reservation plan which involves a recording time coinciding with a recording time of the reservation plan to be added; and the reservation server determines that the reservation plan to be added exceeds the recording ability of the DVR set top box, after the reservation server determines, according to the coincident added reservation plan, that the reservation plan to be added will exceed the recording ability of the DVR set top box if the reservation plan to be added is added.

Preferably, the step of the reservation server performs the conflict processing on the reservation plan to be added may include that the reservation server obtains a set of reservation plans which make the reservation plan to be added exceed the recording ability of the DVR set top box, in the coincident reservation plans; the reservation server determines a priority order between each reservation plan in the set of the reservation plans and the reservation to be added; and when priority of the reservation plan to be added is higher than that of one or more reservation plans in the set of the reservation plans, the reservation server adds the reservation plan to be added, and deletes reservation plans having the lowest priority one by one in sequence in the set of the reservation plans, until the reservation plan to be added does not exceed the recording ability of the DVR set top box.

Preferably, the reservation server determines a priority order between each reservation plan in the set of the reservation plans and the reservation plan to be added in accordance with at least one of the following rules:

the priority of a reservation plan of episodes is higher than the priority of a reservation plan of series; and the priority of a reservation plan of an episode which is set earlier is higher than the priority of a reservation plan of an episode which is set later.

Preferably, the method may further include that after the reservation server adds the reservation plan to be added, the reservation server generates corresponding reservation plan data information and/or time stamp data according to the newly added reservation plan, and synchronizes the generated reservation plan data information and/or the time stamp data to the shared storage server, wherein the time stamp data contains time indicating addition of the reservation plan.

Preferably, the method may further include that after the reservation server synchronizes the generated reservation plan data information and/or the time stamp data to the shared storage server, the shared storage server synchronizes the reservation plan data information and/or the time stamp data to an IPTV service system database.

Preferably, the reservation plan to be added may include a reservation plan of an episode.

Preferably, the method may further include that after the reservation server receives the reservation plan addition request initiated by the DVR set top box, the reservation server selects a reservation server which does not fail currently to respond to the reservation plan addition request according to loads of reservation servers which do not fail currently.

According to another aspect of the embodiments of the disclosure, a reservation server is provided, which includes:

a receiving unit, configured to receive a reservation plan addition request initiated by a DVR set top box, wherein the reservation plan addition request carries a reservation plan to be added;

an obtaining unit, configured to obtain an added reservation plan which corresponds to the DVR set top box and has been added by a user, from a shared storage server;

a determining unit, configured to trigger a conflict processing unit when determining the reservation plan to be added exceeds a recording ability of the DVR set top box according to the obtained added reservation plan; and the conflict processing unit, configured to perform a conflict processing on the reservation plan to be added.

Preferably, the determining unit may include a first determining sub-unit, configured to trigger a second determining sub-unit, when determining that a time difference between current time and completion time of the reservation plan to be added is smaller than a predetermined threshold; and the second determining sub-unit, configured to notify the DVR set top box of that the reservation plan to be added is not allowed to be added.

Preferably, the determining unit may include a third determining sub-unit configured to determine an added reservation plan which involves a recording time coinciding with that of the reservation plan to be added; and a forth determining sub-unit configured to determine that the reservation plan to be added exceeds the recording ability of the DVR set top box after determining, according to the coincident added reservation plan, that the reservation plan to be added will exceed the recording ability of the DVR set top box if the reservation plan to be added is added.

Preferably, the conflict processing unit may include a first processing sub-unit configured to determine a set of reservation plans which make the reservation plan to be added exceed the recording ability of the DVR set top box, in the coincident reservation plans; a second processing sub-unit configured to determine a priority order between each reservation plan in the set of the reservation plans and the reservation plan to be added; and a third processing sub-unit configured to, when the priority of the reservation plan to be added is higher than that of one or more reservation plans in the set of the reservation plans, add the reservation plan to be added, and delete reservation plans having the lowest priority one by one in sequence in the set of the reservation plans until the reservation plan to be added does not exceed the recording ability of the DVR set top box.

In the embodiments of the disclosure, the shared storage server stores reservation plan of users; thus when a reservation plan needs to be added, the reservation server obtains the reservation plan of the corresponding user from the shared storage server, and then performs a conflict processing. Multiple reservation servers in the IPTV reservation system may logically be taken as one reservation server for use; even if a certain reservation server fails, the user carried by the failed reservation server may also be transferred to other reservation servers for processing, thus ensuring effective processing of the reservation plans and resource sharing, and solving the problem in the related art that the reservation plans of users are all stored in a reservation server, resulting in a relatively heavy load of the reservation server. Moreover, since the reservation plans are stored in the shared storage server, thus the reservation plans may be shared between the reservation servers, in this way, when one reservation server fails, the service carried by the failed reservation server may be transferred to other reservation servers for processing, thus improving the failure processing ability of the IPTV reservation system, and reducing the loads of the reservation servers.

BRIEF DESCRIPTION OF THE DRAWINGS

FIG. 8 is an interaction flowchart of the reservation plan management method according to an embodiment of the disclosure.

DETAILED DESCRIPTION

Detailed explanation will be given below with reference to appended drawings in combination with the embodiments. It should be noted that the embodiments described below and features in the embodiments may be combined with each other if no conflict.

Figure 1:
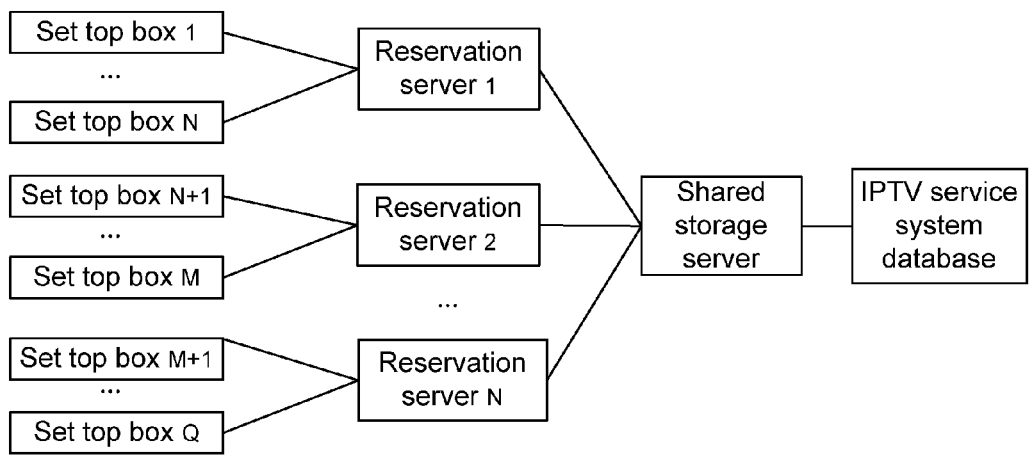
FIG. 1 is a preferred structural diagram of an IPTV reservation system according to an embodiment of the disclosure.

As shown in FIG. 1, ab embodiment of the disclosure provides a preferred IPTV reservation system, and this system includes a DVR set top box (wherein the DVR set top box is a set top box having a local digital video recording function), at least two reservation servers, a shared storage server, and an IPTV service system database. These devices are described in detail below:

1) the DVR set top box is configured to initiate a reservation plan addition request, wherein the reservation plan addition request carries a reservation plan to be added; a reservation plan is referred to a task of recording an assigned program within the recording time set by an IPTV user, namely the user may set a reservation plan for a program through the DVR set top box; when it is time to play the program for which the reservation plan is set, the DVR set top box records this program;

2) at least two reservation servers are connected with the DVR set top box and are configured to generate reservation plans of the user according to the reservation plan addition request; preferably, the IPTV reservation system may have multiple DVR set top boxes, but the number of reservation servers is generally much smaller than the number of DVR set top boxes; therefore one reservation server may manage and control the reservation plans of multiple DVR set top boxes; the reservation plans added by the user are added and managed through the reservation servers connected with the DVR set top boxes, the reservation plans are generated by the reservation servers and sent to the DVR set top boxes;

3) the shared storage server is connected with multiple reservation servers, and is configured to store the reservation plans of the user; in this preferred embodiment, the shared storage server is set in the IPTV reservation system to store the reservation plans of all users, namely the reservation plans generated by each reservation server should be stored in the shared storage server, correspondingly, when a reservation server needs to obtain the reservation plans which have been added by a certain user, the reservation plans may be obtained from the shared storage server, thus making all reservation servers in the IPTV reservation system capable of accessing data of the reservation plans in the shared storage server, and making the shared storage server capable of using Dentry cache (Dcache) technology, and further improving a response performance. In this way, multiple reservation servers in the IPTV reservation system may be logically taken as one reservation server for use; even if a certain reservation server fails, the user carried by the reservation server may be transferred to other reservation servers for processing, thus ensuring effective processing of the reservation plan and resource sharing; storing the reservation plans of the user in the shared storage server reduces the load of the reservation serer to a certain extent;

4) the IPTV service system database is connected with the shared storage server, and is configured to store the reservation plans of the user which are synchronized by the shared storage server.

Figure 2:
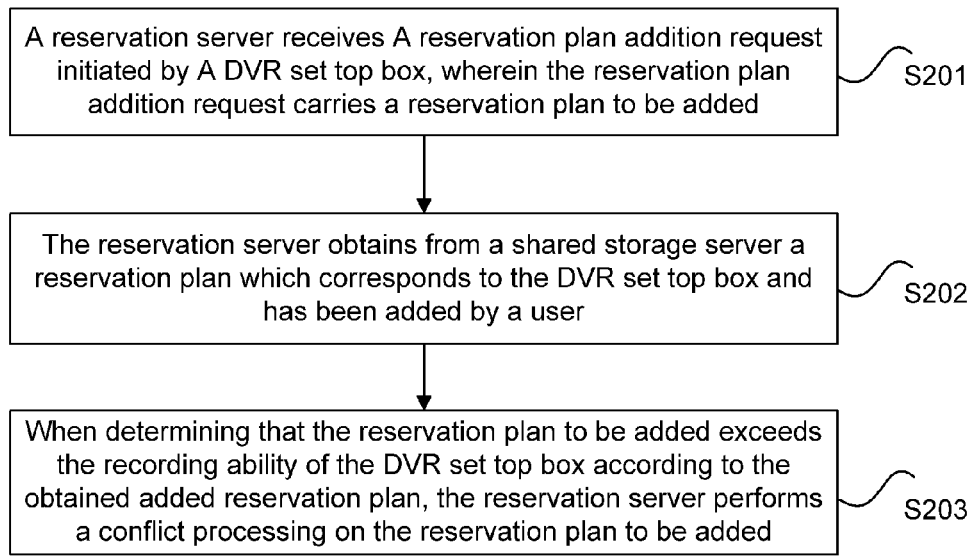
FIG. 2 is a preferred flowchart of a reservation plan management method according to an embodiment of the disclosure.

Based on the IPTV reservation system shown in FIG. 1, another embodiment of the disclosure provides a preferred reservation plan management method, as shown in FIG. 2, which includes the following steps:

Step S201: a reservation server receives a reservation plan addition request initiated by a DVR set top box, wherein the reservation plan addition request carries a reservation plan to be added;

Step S202: the reservation server obtains from a shared storage server a reservation plan which corresponds to this DVR set top box and has been added by the user; and Step S203: when determining that the reservation plan to be added exceeds the recording ability of the DVR set top box according to the obtained added reservation plan, the reservation server performs a conflict processing on the reservation plan to be added.

In the above preferred embodiment, the reservation plan of the user is stored in the shared storage server, thus when the reservation plan needs to be added, the reservation server obtains the reservation plan of the user from the shared storage server, and then performs a conflict processing, which reduces the load of the reservation server, and solves the problem that in the related art the reservation plans of the user are all stored in a reservation server, resulting in the relatively heavy load of the reservation server; multiple reservation servers in the IPTV reservation system may logically be taken as one reservation server for use; even if a certain reservation server fails, the user carried by the reservation server may be transferred to other reservation servers for processing, which prevents the problem that in the related art the reservation plans are all stored in a reservation serve and service transfer among multiple reservation servers cannot be performed, and improves the failure processing ability of the IPTV reservation system.

Figure 3:
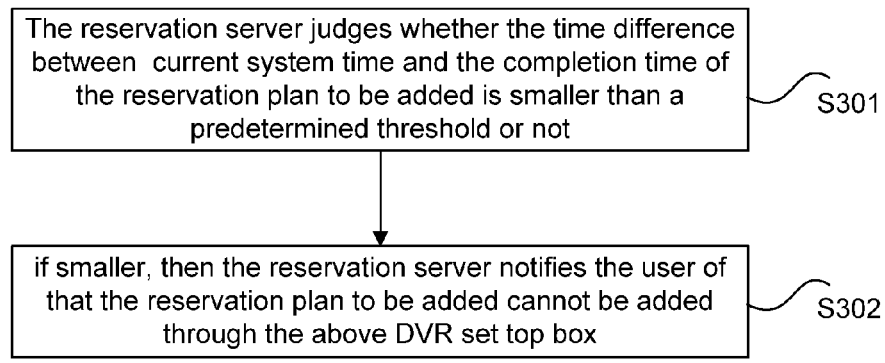
FIG. 3 is another preferred flowchart of the reservation plan management method according to an embodiment of the disclosure.

Considering that addition of a reservation plan by a user is relatively late sometimes, namely probably the recording completion time of a program corresponding to a certain reservation plan is very close to current time, in a word, the program which the user excepts to record is almost over, at which moment, adding a reservation plan for this program does not make any sense; in this case, in order to reduce occupation of system resources, the DVR set top box may be notified of that the program corresponding to this added reservation plan cannot be recorded. In a preferred embodiment, after the reservation server receives the reservation plan addition request initiated by the DVR set top box, as shown in FIG. 3, the method may further include:

Step S301: the reservation server judges whether the time difference between the current time and the completion time of the reservation plan to be added is smaller than a predetermined threshold or not;

Step S302: if smaller, then the reservation server notifies the DVR set top box of that this reservation plan to be added cannot be added. For example, if the program requested by this reservation plan to be recorded will be over after two minutes, then the user may be notified of that this program will be ended soon, and therefore this reservation plan cannot be added.

With regard to the above Step S203, the number of programs allowed to be simultaneously recorded by a general set top box is certainly limited because of limitation of the memory or storing ability of the general set top box. For example, probably only three programs can be recorded at the same time. Therefore, when determining that a reservation plan to be added exceeds the recording ability of the DVR set top box, the added reservation plan which involves a recording time coinciding with that of the program corresponding to the reservation plan to be added can be determined; in a preferred embodiment, implementation can be performed in the following way: the reservation server determines the obtained added reservation plan which has a recording time coinciding with that of the reservation plan to be added; the reservation server determines that the reservation plan to be added exceeds the recording ability of the DVR set top box after the reservation server determines, according to the coincident added reservation plan, that the reservation plan to be added will exceed the recording ability of the DVR set top box if the reservation plan to be added is added.

Figure 4:
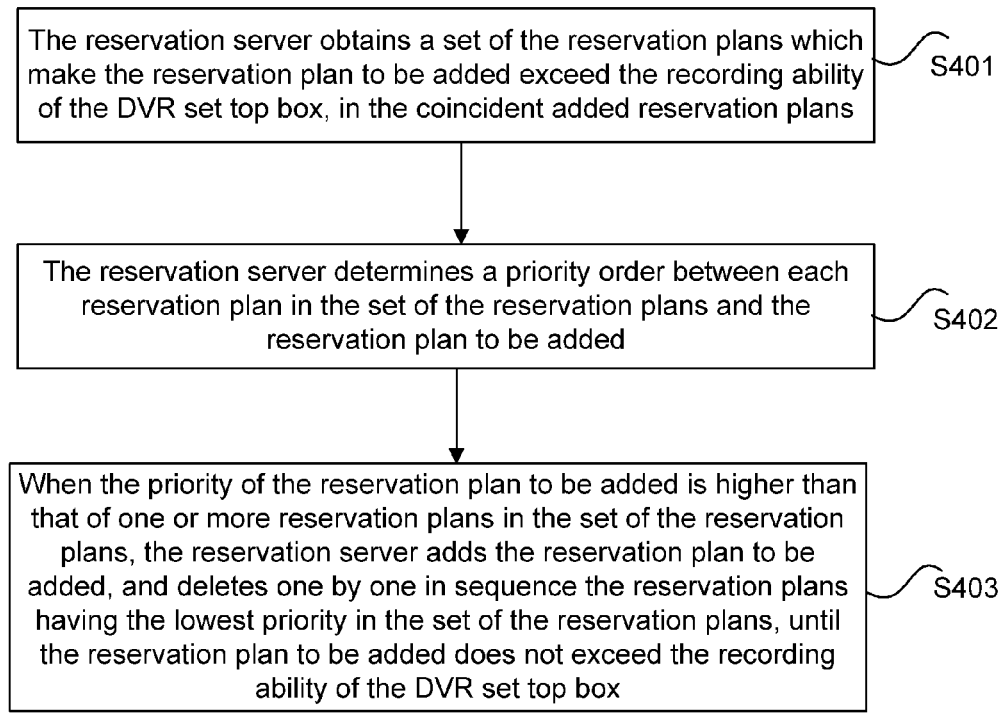
FIG. 4 is another preferred flowchart of the reservation plan management method according to an embodiment of the disclosure.

After obtaining the corresponding coincident added reservation plan, the conflict processing may be performed in the way as shown in FIG. 4, which includes the following steps:

Step S401: the reservation server obtains a set of reservation plans which make the reservation plan to be added exceed the recording ability of the DVR set top box, in the coincident added reservation plans;

Step S402: the reservation server determines a priority order between each reservation plan in the set of the reservation plans and the reservation plan to be added;

Step S403: when the priority of the reservation plan to be added is higher than that of one or more reservation plans in the set of the reservation plans, the reservation server adds the reservation plan to be added, and deletes one by one in sequence the reservation plans having the lowest priority in the set of the reservation plans, until the reservation plan to be added does not exceed the recording ability of the DVR set top box.

The set of the reservation plans may be the reservation plans coincided in different time intervals, for example, the reservation plan to be added is 13:00 to 15:00, probably three reservation plans coincide with the reservation plan to be added between 13:00 and 13:30, and four reservation plans coincide with the reservation plan to be added between 14:15 and 14:30. Then the three reservation plans between 13:00 and 13:30 are taken as a set of reservation plans, and the four reservation plans between 14:15 and 14:30 are taken as another set of reservation plans.

In a preferred embodiment, considering that sometimes when a user adds a reservation plan, the recording time of an episode coincides with that of series (including TV serials), namely when a conflict emerges, probably the user further hopes to record this episode. In order to improve user experience, in a preferred embodiment, whether the priority is high or low is determined by at least one of the following ways:

1) the priority of a reservation plan of episodes is higher than the priority of a reservation plan of series; and 2) the priority of a reservation plan of an episode which is set earlier is higher than the priority of a reservation plan of an episode which is set later.

However, the above two priority judging ways are only two preferred embodiments, in the embodiment of the disclosure other priority rules may also be set according to a requirement of a user or a bearing capability of a system; for example, the priority may be set in accordance with a time length of a program, and etc.

In order to store a newest reservation plan of a user in the shared storage server, in one preferred embodiment, after the reservation plan to be added is added, the reservation server generates corresponding reservation plan data information and/or time stamp data according the newly added reservation plan, and synchronizes the same to the shared storage server, wherein the time stamp data include the time indicating addition of the reservation plan. After the time stamp data is updated, a time point for updating this reservation plan can be known, thus facilitating subsequent processing.

All the above information needs backup in the IPTV service system database to be uniformly managed. In this way, even if the shared storage server fails, the corresponding reservation plan information still can be obtained from the IPTV service system database. In a preferred embodiment, after the reservation server generates the corresponding reservation plan data information and/or time stamp data according to the newly added reservation plan and stores the same in the shared storage server, the shared storage server synchronizes the reservation plan data information and/or time stamp data to the IPTV service system database.

In each preferred embodiment above, what the reservation plan to be added requires to add includes an episode.

In order to effectively handle a failure, that is when one reservation server fails, the reservation plans of a user which correspond to the failed reservation server can be performed normally, the reservation server which has relatively low load or which does not have enough workload is selected from other reservation servers to carry the service of this failed reservation server. Of course, the service of the reservation server which fails may be distributed to each reservation server which is in a good state at present. In a preferred embodiment, if the reservation server corresponding to the DVR set top box fails, then a reservation server is selected from the reservation servers which never fail in accordance with a load situation to process the reservation plan addition request.

Figure 5:
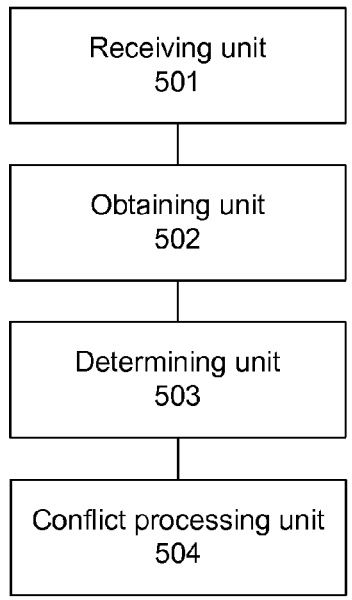
FIG. 5 is a preferred structural block diagram of a reservation server according to an embodiment of the disclosure.

In this embodiment, a reservation server is also provided, and the reservation server is configured to implement the above embodiment and the preferred implementation modes, so repeated description will not be given again. As mentioned below, the term "unit" or "sub-unit" may be a combination of software and/or hardware for implementing a predetermined function; although a device described in the following embodiment is preferably implemented by software, it is also possible and conceivable to implement the device by hardware or the combination of software and hardware. FIG. 5 is a preferred structural block diagram of a reservation server according to an embodiment of the disclosure, as shown in FIG. 5, the reservation server includes a receiving unit 501, an obtaining unit 502, a determining unit 503, and a conflict processing unit 504. The structure is explained below:

1) the receiving unit 501 is configured to receive a reservation plan addition request initiated by a DVR set top box, wherein the reservation plan addition request carries a reservation plan to be added;

2) the obtaining unit 502 coupled with the receiving unit 502, is configured to obtain an added reservation plan which corresponds to the DVR set top box and has been added by a user, from a shared storage server;

3) the determining unit 503 coupled with the obtaining unit 502, is configured to trigger the conflict processing unit 504 when determining that the reservation plan to be added exceeds the recording ability of the DVR set top box, according to the obtained added reservation plan; and 4) the conflict processing unit 504 coupled with the determining unit 503, is configured to perform a conflict processing on the reservation plan to be added.

Figure 6:
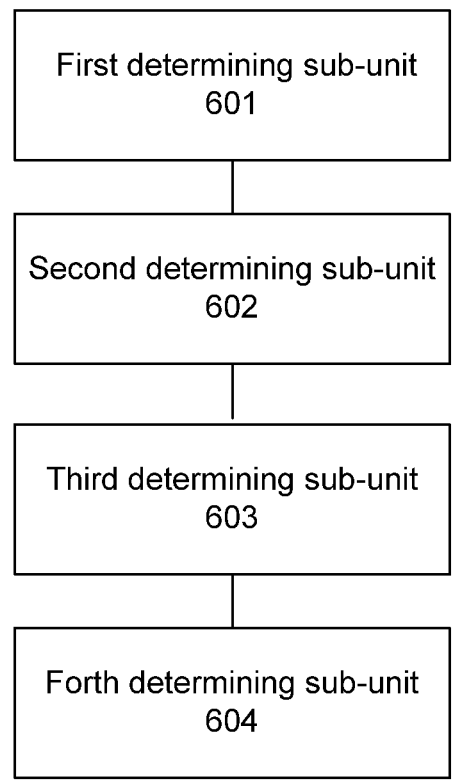
FIG. 6 is a preferred structural block diagram of the determining unit in the reservation server according to an embodiment of the disclosure.

In a preferred implementation mode, as shown in FIG. 6, the determining unit 503 includes:

a first determining sub-unit 601, configured to trigger a second determining sub-unit 602 when determining that the time difference between the current time and the complete time of the reservation plan to be added is smaller than a predetermined threshold;

the second determining sub-unit 602, configured to notify the DVR set top box of that the reservation plan to be added cannot be added;

a third determining sub-unit 603, configured to, determine an added reservation plan which involves the recording time coinciding with the recording time of the reservation plan to be added; and a forth determining sub-unit 604, configured to determine that the reservation plan to be added exceeds the recording ability of the DVR set top box, after determining, according to the coincident added reservation plan, that the reservation plan to be added will exceed the recording ability of the DVR set top box if the reservation plan to be added is added.

Figure 7:
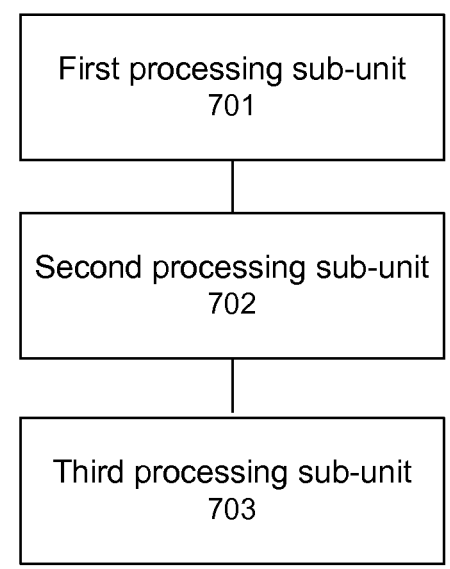
FIG. 7 is a preferred structural block diagram of the processing unit in the reservation server according to an embodiment of the disclosure.

In a preferred implementation mode, as shown in FIG. 7, the conflict processing unit 504 includes:

a first processing sub-unit 701, configured to determine a set of reservation plans which make the reservation plan to be added exceed the recording ability of the DVR set top box, in the coincident reservation plans;

a second processing sub-unit 702, configured to determine a priority order between each reservation plan in the set of the reservation plans and the reservation plan to be added; and a third processing sub-unit 703, configured to, when the priority of the reservation plan to be added is higher than that of one or more reservation plans in the set of the reservation plans, add the reservation plan to be added, and delete the reservation plans having the lowest priority in the set of the reservation plans one by one in sequence, until the reservation plan to be added does not exceed the recording ability of the DVR set top box.

Each unit of the IPTV reservation system shown in FIG. 1 is further described in details.

The reservation server may logically be taken as an independent system, and may be deployed separately from the IPTV service system. Interaction is performed between the reservation server and the IPTV service system through a standard interface. The reservation server is mainly responsible for managing reservation plans or processing affairs related to recording, which mainly includes the following contents:

1) conflict processing when user's reservation plans have a conflict;

2) management of user's reservation plans;

3) synchronization of reservation plans to a DVR set top box;

4) management of a priority list of series; and 5) maintenance of home DVR information and user information.

The DVR set top box is a set top box having a local recording function, and the set top box is divided into a service layer and a support layer, wherein the service layer is template+script language (JS, JavaScript), and is configured to provide a page display function such as reservation plan management, recorded file management, and the like; and the support layer is configured to provide scheduled recording of a reservation plan and maintenance of a recorded file. However, because limitation of a factor, such as, the number of reservation plans which can be simultaneously executed by a DVR set top box is limited due to limitation of the Centre Processing Unit (CPU), memory and bandwidth of the DVR set top box and other limitation factors. For example, only the programs corresponding to three reservation plans can be recorded, these three reservation plans may be identified as the recording ability.

Generally, there are two types of IPTV programs, namely episodes and series. When the recording time of reservation plans coincides, the reservation server needs to perform a conflict processing in accordance with a certain priority rule; preferably the priority rule for the conflict processing includes at least one of the followings:

1) the priority of the reservation plan of episodes is higher than priority of the reservation plan of series;

2) between the episodes, the priority of a reservation plan of an episode which is set earlier is higher than the priority of a reservation plan of an episode which is set later.

3) between the series, judgment may be made according to a priority list preset by the system; between the episodes of the same series, processing may be performed in accordance with the above priority rule of the reservation plans of the episodes.

The shared storage server is configured to store reservation plans of a user, enabling all reservation servers to form an entity logically, and effectively achieving load balance and prompt processing of failures.

The management of reservation plans based on the above IPTV reservation system may be performed in accordance with a procedure below, which includes:

Step S1: supposing that a current reservation plan is recording an episode P0, the reservation server performs a conflict processing by taking current episode time as reference;

Step S2: if the interval between the current time and the ending time of the program is two minutes, then a prompt that "This program is ended, and cannot be recorded" is directly returned, namely the user is directly notified of that this program is almost over and cannot be recorded; and Step S3: otherwise, the reservation server begins to process a conflict, wherein the conflict means that there is an added reservation plan which involves a recording time coinciding with that of the episode P0, and if the reservation plan of the episode P0 is added, the coincident added reservation plan will make the reservation plan of the episode P0 exceed the recording ability of the DVR set top box. If there is no added reservation plan which involves a recording time coinciding with that of the episode P0, or if after the reservation plan of the episode P0 is added, the coincident added reservation plan fails to make the reservation plan of the episode P0 exceed the recording ability of the DVR set top box, then the reservation plan of the episode P0 is directly added.

The conflict processing is explained below by taking an example:

supposing that after the reservation server adds the reservation plan of the episode P0, there are five sets of reservation plans which make the reservation plan of P0 exceed the recording ability of the DVR in the added reservation plans, namely (P1, P2, P3, P4), (S1EP1, P5, S2EP1, S3EP1), (P6, S1EP2, S2EP2, S3EP1), (P7, P8), and (P9, S1EP3). Px represents an episode ProgramX, and SxEPy represents EpisodeY of SeriesX.

Supposing that a priority order of the reservation plans of current series is (S1, S2, S3), namely the priority of S1 is the highest, S3 is the lowest, a setting time sequence of the reservation plans of episodes is (P1, P2, P3, . . . , P9), namely the priority of P1 is the highest, and the priority of P9 the lowest.

Based on the above rule, the priority order of the five sets may be determined like this:

(1) the priority order of (P1, P2, P3, P4) is (P1, P2, P3, P4);

(2) the priority order of (S1EP1, P5, S2EP1, S3EP1) is (P5, S1EP1, S2EP1, S3EP1);

(3) the priority order of (P6, S1EP2, S2EP2, S3EP1) is (P6, S1EP2, S2EP2, S3EP1);

(4) the priority order of (P7, P8) is (P7, P8); and (5) the priority order of (P9, S1EP3) is (P9, S1EP3).

With regard to sorted five sets, the conflict processing is separately performed on each set. Supposing the recording ability of the current DVR set top box is four, namely the DVR set top box can simultaneously process reservation plans of four programs; four reservation plans has existed in the sets (P1, P2, P3, P4), (S1EP1, P5, S2EP1, S3EP1), and (P6, S1EP2, S2EP2, S3EP1, S3EP2), thus if the reservation plan of the episode P0 is added in the set (P1, P2, P3, P4), (S1EP1, P5, S2EP1, S3EP1), or (P6, S1EP2, S2EP2, S3EP1, S3EP2), then the reservation plan of the episode P0 will exceed the recording ability of the DVR set top box; supposing that the reservation plan of the episode P0 needs to be added in the set (S1 EP1, P5, S2EP1, S3EP1), if the reservation plan (supposed to be S3EP1) of which the priority is lower than that of P0 exists in the set (S1 EP1, P5, S2EP1, S3EP1), then the reservation plan of S3EP1 is deleted and the reservation plan of the episode P0 is added.

Preferably, when prompting to process a conflict between reservation plans, the conflict may be handled by the following way: providing two operation buttons, namely "Record" and "Don't record", at the lowest place of a set top box page, wherein "Record" represents recording an episode; if the user selects to record the episode, a processing mechanism of the reservation server is checking a set of the reservation plans which have been added and make the reservation plan of the episode exceed the recording ability of the DVR set top box, and if the set is reservation plans of episodes, then deleting the reservation plan of the episode, and if the set is reservation plans of series, then identifying the reservation plan as "Don't record", and then adding the reservation plan of the episode, and notifying the DVR set top box to update the reservation plans.

"Don't record" represents not recording the episode; if the user selects not to record the episode, then the reservation server does not perform processing.

Through the above implementation modes, an IPTV user may process a conflict effectively when adding an episode reservation plan, to determine whether this reservation plan can be added or not.

As shown in FIG. 8, an embodiment also provides a preferred implementation mode to further explain the disclosure, but it should be noted that this preferred implementation mode is only to better describe the disclosure and does not construct improper limitation to the disclosure. The implementation mode includes the following steps:

Step S801: when a user adds an episode reservation plan on a template, a set top box transmits a request for addition of the episode reservation plan to a reservation server;

Step S802: the reservation server obtains a reservation plan list of the user according to data and time of the newly added reservation plan;

Step S803: the reservation server determines a reservation plan which conflicts with this newly added reservation plan;

Step S804: if no conflict reservation plan exists, then the reservation server directly adds the reservation plan, the reservation server updates the reservation plan data of the user and the updating time stamp data of user reservation plans in the shared storage server, and records an updating record of the user, to regularly synchronize the reservation plan of the user to the database of the IPTV service system;

Step S805: if a conflict reservation plan exists, then the reservation server temporarily stores the newly added reservation plan and the conflict reservation plan in the shared storage server, and then returns a conflict result and a conflict list to the set top box;

Step S806: the set top box displays the conflict information to the user, thus the user can select to record or not to record this newly added reservation plan;

Step S807: if the user selects no to record, then the reservation server clears the cached newly added reservation plan;

Step S808: if the user selects to record, then the reservation server obtains from the shared storage server the reservation plan information in a temporary cache and the actual reservation plan of the user, and adds this newly added reservation plan. The reservation server updates the reservation plan data of the user and the updating time stamp data of the user reservation plan in the shared storage server, and records the updating record of the user, thus regularly synchronizing the reservation plan of the user to the IPTV service system database; and Step S809: the reservation server returns a reservation conflict processing result, if processing is successful, then a set top box interface is employed to notify the DVR set top box to update the reservation plan.

In another embodiment, software is provided, which is designed to execute the technical scheme in the above embodiment and the preferred implementation modes.

In still another embodiment, a storage medium is provided, which stores the above software; the storage medium includes but not is limited to: an optical disk, a floppy disk, a hard disk, an erasable memory, and etc.

It can be seen from the above description that the disclosure implements the following technical effects: a shared storage server stores reservation plans of users, thus when a reservation plan needs to be added, a reservation server obtains the reservation plans of a corresponding user from the shared storage server, and then performs a conflict processing, thereby reducing the load of the reservation server, solving the problem in the related art that the reservation plans of the users are all stored in a corresponding reservation server which results in the relatively heavy load of the reservation server; multiple reservation servers in an IPTV reservation system may logically be taken as a reservation server for use, even if a certain reservation server fails, a user carried by the failed reservation server may be transferred to other reservation servers for processing, thus avoiding the problem in the related art that all reservation plans are stored in a reservation server and service transfer between multiple reservation servers cannot be achieved, and improving failure processing ability of the IPTV reservation system.

It should be understood by those skilled in the art that, the above each unit or step of the embodiments of the disclosure may be implemented by a universal computing device, and they may be centralized in a single computing device, or distributed in a network composed of multiple computing devices; alternatively, they may be implemented by a program code executable by the computing device, thus they may be stored in a storage device to be executed by the computing device; in a certain situation, the illustrated or described steps may be executed in a sequence different from that described here, or they may be separately made into various integrated circuit modules, or multiple modules or steps thereof may be made into a single integrated circuit module for implementation. In this way, the disclosure is not limited to any specific combination of hardware and software.

All those described are only preferred embodiments of the disclosure, and are not intended to limit the disclosure. With regard to those skilled in the art, the disclosure may have various alternations or variations. Any modification, alternation, improvement, and so on within spirit and principle of the disclosure will be contained in the protection scope of the disclosure.

INDUSTRIAL APPLICABILITY

The embodiments of the disclosure disclose an IPTV reservation system, and a reservation plan management method and device. When determining a reservation plan to be added exceeds the recording ability of a DVR set top box according to an added reservation plan, the reservation server performs a conflict processing on the reservation plan to be added, solving the technical problem in the related art that the load of a reservation server is too heavy, and the failure processing ability of the IPTV reservation system is relatively weak, and reducing the load of the reservation server.

The invention claimed is:
1. An Interactive Personal/Internet Protocol Television (IPTV) reservation system, comprising a Digital Video Recorder (DVR) set top box, at least two reservation servers, and a shared storage server; wherein:
the DVR set top box is a set top box having a local recording function and a recording ability, and is configured to initiate a reservation plan addition request, wherein the reservation plan addition request carries a reservation plan to be added, wherein a number of reservation plans can be simultaneously executed by the DVR set top box, which can be identified as the recording ability of the DVR set top box;
the at least two reservation servers each is connected with the DVR set top box, and is configured to receive the reservation plan addition request initiated by the DVR set top box, and configured to obtain from the shared storage server added reservation plans which correspond to the DVR set top box and have been added by a user and to perform, when determining that the reservation plan to be added exceeds the recording ability of the DVR set top box according to the obtained added reservation plans, a conflict processing on the reservation plan to be added; and
the shared storage server is connected to the at least two reservation servers, and is configured to store the added reservation plans which correspond to the DVR set top box and have been added by the user,
wherein determining that the reservation plan to be added exceeds the recording ability of the DVR set top box according to the obtained added reservation plans comprising:
determining, by one of the reservation servers, added reservation plans which involve a recording time coinciding with a recording time of the reservation plan to be added; and
determining, by one of the reservation servers, that the reservation plan to be added exceeds the recording ability of the DVR set top box, after determining, according to the coincident added reservation plans, that the reservation plan to be added will exceed the recording ability of the DVR set top box if the reservation plan to be added is added,
wherein performing the conflict processing on the reservation plan to be added comprising:
determining, by one of the reservation servers, a set of reservation plans which make the reservation plan to be added exceed the recording ability of the DVR set top box, in the coincident added reservation plans;
determining, by one of the reservation servers, a priority order between each reservation plan in the set of the reservation plans and the reservation to be added; and
when priority of the reservation plan to be added is higher than priority of one or more reservation plans in the set of the reservation plans, adding, by one of the reservation servers, the reservation plan to be added, and deleting reservation plans having lowest priority one by one in sequence in the set of the reservation plans until the reservation plan to be added does not exceed the recording ability of the DVR set top box,
wherein after one of the reservation servers receives the reservation plan addition request initiated by the DVR set top box and when the reservation server has a failure, selecting a reservation server which does not fail currently to respond to the reservation plan addition request, according to loads of reservation servers which do not fail currently.

2. The system according to claim 1, further comprising an IPTV service system database, connected with the shared storage server and configured to store reservation plan data information and/or time stamp data synchronized to the IPTV service system database by the shared storage server.

3. A reservation plan management method, comprising:
receiving, by a reservation server, a reservation plan addition request initiated by a Digital Video Recorder (DVR) set top box, wherein the reservation plan addition request carries a reservation plan to be added, wherein the DVR set top box is a set top box having a local recording function and a recording ability, wherein a number of reservation plans can be simultaneously executed by the DVR set top box, which can be identified as the recording ability of the DVR set top box;
obtaining, by the reservation server, added reservation plans which correspond to the DVR set top box and have been added by a user from a shared storage server; and
performing, by the reservation server, a conflict processing on the reservation plan to be added, when the reservation server determines that the reservation plan to be added exceeds the recording ability of the DVR set top box according to the obtained added reservation plans,
wherein determining, by the reservation server, that the reservation plan to be added exceeds the recording ability of the DVR set top box according to the obtained added reservation plans comprising:
determining, by the reservation server, added reservation plans which involve a recording time coinciding with a recording time of the reservation plan to be added; and
determining, by the reservation server, that the reservation plan to be added exceeds the recording ability of the DVR set top box, after determining, according to the coincident added reservation plans, that the reservation plan to be added will exceed the recording ability of the DVR set top box if the reservation plan to be added is added,
wherein performing, by the reservation server, the conflict processing on the reservation plan to be added comprising:
determining, by the reservation server, a set of reservation plans which make the reservation plan to be added exceed the recording ability of the DVR set top box, in the coincident added reservation plans;

determining, by the reservation server, a priority order between each reservation plan in the set of the reservation plans and the reservation to be added; and when priority of the reservation plan to be added is higher than priority of one or more reservation plans in the set of the reservation plans, adding, by the reservation server, the reservation plan to be added, and deleting reservation plans having lowest priority one by one in sequence in the set of the reservation plans until the reservation plan to be added does not exceed the recording ability of the DVR set top box, the method further comprising: after the reservation server receives the reservation plan addition request initiated by the DVR set top box and when the reservation server has a failure, selecting a reservation server which does not fail currently to respond to the reservation plan addition request, according to loads of reservation servers which do not fail currently.

4. The method according to claim 3, further comprising after the reservation server receives the reservation plan addition request initiated by the DVR set top box and determines that a time difference between current time and completion time of the reservation plan to be added is smaller than a predetermined threshold, notifying, by the reservation server, the DVR set top box of that the reservation plan to be added is not allowed to be added.

5. The method according to claim 3, wherein the reservation server determines the priority order between each reservation plan in the set of the reservation plans and the reservation plan to be added in accordance with at least one of following rules:

priority of a reservation plan of episodes is higher than priority of a reservation plan of series; and priority of a reservation plan of an episode which is set earlier is higher than priority of a reservation plan of an episode which is set later.

6. The method according to claim 3, further comprising:
after the reservation server adds the reservation plan to be added, generating, by the reservation server, corresponding reservation plan data information and/or time stamp data according to the added reservation plan, and synchronizing the generated reservation plan data information and/or the time stamp data to the shared storage server, wherein the time stamp data comprises time indicating addition of the reservation plan.

7. The method according to claim 6, further comprising:
synchronizing, by the shared storage server, the reservation plan data information and/or the time stamp data to an Interactive Personal/Internet Protocol Television (IPTV) service system database, after the reservation server synchronizes the generated reservation plan data information and/or the time stamp data to the shared storage server.

8. The method according to claim 3, wherein the reservation plan to be added comprises a reservation plan of an episode.

9. A reservation server, comprising:
a receiving unit, configured to receive a reservation plan addition request initiated by a Digital Video Recorder (DVR) set top box, wherein the reservation plan addition request carries a reservation plan to be added, wherein the DVR set top box is a set top box having a local recording function and a recording ability, wherein a number of reservation plans can be simultaneously executed by the DVR set top box, which can be identified as the recording ability of the DVR set top box;

an obtaining unit, configured to obtain added reservation plans which corresponds to the DVR set top box and have been added by a user, from a shared storage server;

a determining unit, configured to trigger a conflict processing unit when determining the reservation plan to be added exceeds the recording ability of the DVR set top box according to the obtained added reservation plans; and the conflict processing unit, configured to perform a conflict processing on the reservation plan to be added, wherein the determining unit comprises a third determining sub-unit configured to determine added reservation plans which involve a recording time coinciding with a recording time of the reservation plan to be added; and a forth determining sub-unit, configured to determine that the reservation plan to be added exceeds the recording ability of the DVR set top box, after determining, according to the coincident added reservation plans, that the reservation plan to be added will exceed the recording ability of the DVR set top box if the reservation plan to be added is added, wherein the conflict processing unit comprises:

a first processing sub-unit, configured to determine a set of reservation plans which make the reservation plan to be added exceed the recording ability of the DVR set top box, in the coincident reservation plans;

a second processing sub-unit, configured to determine a priority order between each reservation plan in the set of the reservation plans and the reservation plan to be added; and a third processing sub-unit, configured to, when priority of the reservation plan to be added is higher than priority of one or more reservation plans in the set of the reservation plans, add the reservation plan to be added, and delete the reservation plans having lowest priority one by one in sequence in the set of the reservation plans, until the reservation plan to be added does not exceed the recording ability of the DVR set top box, wherein after the reservation server receives the reservation plan addition request initiated by the DVR set top box and when the reservation server has a failure, selecting a reservation server which does not fail currently to respond to the reservation plan addition request, according to loads of reservation servers which do not fail currently.

10. The reservation server according to claim 9, wherein the determining unit comprises a first determining sub-unit, configured to trigger a second determining sub-unit when determining that a time difference between current time and completion time of the reservation plan to be added is smaller than a predetermined threshold; and the second determining sub-unit, configured to notify the DVR set top box of that the reservation plan to be added is not allowed to be added.

11. The method according to claim 4, wherein the reservation plan to be added comprises a reservation plan of an episode.

* * * * *